M. & S. S. SAGE.
Grain Drill.
No. 7,293.  Patented Apr. 16, 1850.
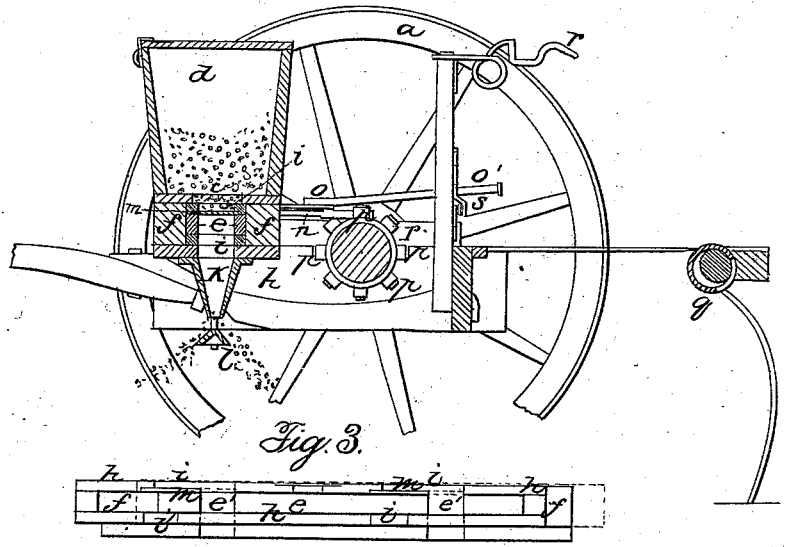
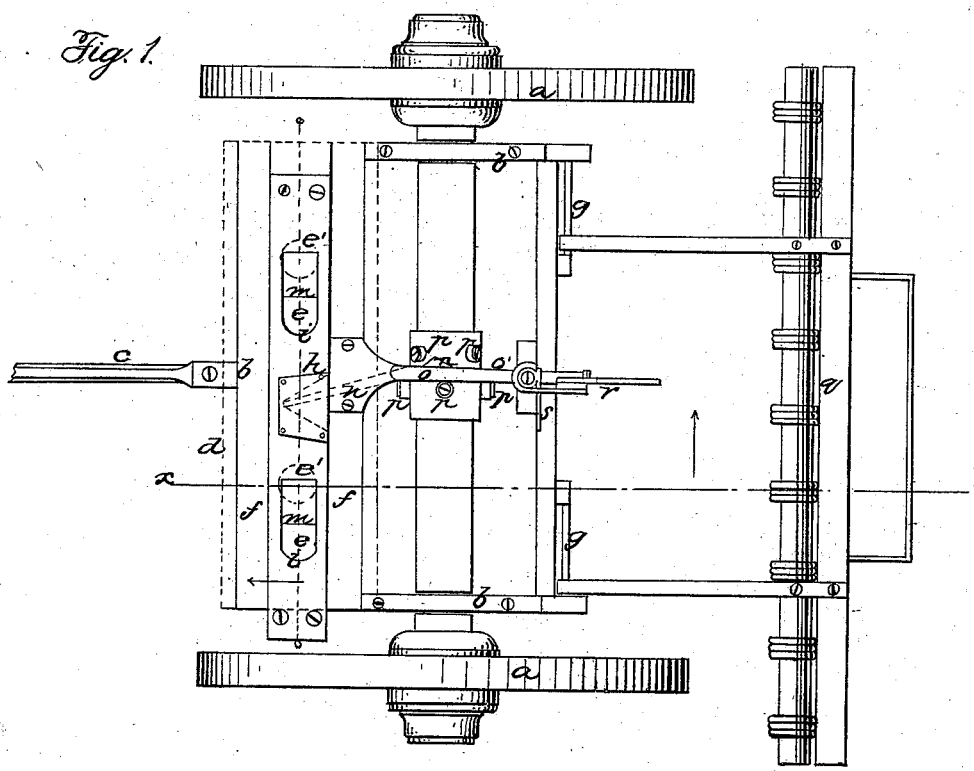

UNITED STATES PATENT OFFICE.

M. SAGE AND S. S. SAGE, OF WINDSOR, NEW YORK.

IMPROVEMENT IN ATTACHMENT OF HARROWS TO SEED-PLANTERS.

Specification forming part of Letters Patent No. 7,293, dated April 16, 1850.

*To all whom it may concern:*

Be it known that we, MARCUS SAGE and SILAS S. SAGE, of Windsor, in the county of Broome and State of New York, have invented a new and useful Machine for Sowing and Covering Grain; and we do hereby declare that the following is a full description of the construction and operation of the same, reference being made to the accompanying drawings.

We take two wheels, $a$, of any convenient size, with an axle of the length we wish to sow in crossing a field. One wheel is made fast to the axle. The other may turn upon it. On these we construct a frame, $b$, of such shape and dimensions as may be most convenient for attaching a tongue, $c$, and other apparatus necessary, and for supporting a hopper, $d$, to contain the seed, extending nearly to each wheel. For measuring the seed we take a strip of wood, $e$, a little shorter than the hopper, about half an inch thick, with holes $e'$ through it, about one foot apart, five-eighths of an inch in diameter, or any size that may be desired for a given quantity of seed. Fasten this by the edges to two other pieces, $f$, so that a double slide, $h$, one part above and the other below it, may be moved back and forth about one inch and a quarter. This slide has holes $i\ i'$ in each part, so that when it is moved one way the holes $i$ in the upper part will correspond with those, $e'$, in the measuring-piece, and when moved the other way the holes $i'$ in the lower part will be under the same, so that by placing the hopper over this measuring apparatus so arranged that the seed will rest on the upper slide by moving it one way the holes in the measuring-piece will be filled through the upper slide. On moving the other way they will empty through the lower part of the slide. Below these we place tubes $k$, four or five inches long, to guide the seed to fall on a cone or convex surface, $l$, which will scatter it nearly equal in all directions.

To prevent kernels from being bruised or broken when only partially in the measuring-holes, we fix a spring, $m$, in the upper slide that will pass over them without injury. The slide is moved by a lever, $n$, fixed to a fulcrum, $o$, about one-fourth of the length from the larger end, which is wedge-shaped, or two inclined planes forming an acute angle. This lever is placed with the longer end connected with the slide and the shorter end over the axle. In the axle, which is round, are set two rows of studs, $p$, with friction-rollers on them, to act alternately against the inclined planes of the lever, thereby moving the slide the required distance each way, and are at such distance from each other as is requisite for a given number of motions in each revolution of the wheel.

Behind this machine, and attached to it, we place a harrow, $q$, the width of the wheels, constructed with spring-teeth, and connected with the machine in such a manner that it may be made to follow either wheel, leaving the other track undisturbed, to be followed back again. For convenience in turning round at the end of a field the harrow can be raised up and held by a catch-spring, $r$, prepared for that purpose, and the feeding-lever raised above the studs in the axle by lever $o'$, and held by a spring, $s$, so that no seed will be scattered while turning.

Figure 1 in the drawings is a plan of the machine, the hopper being shown transparent by red lines; Fig. 2, a vertical section on line $x\ x$, Fig. 1; Fig. 3, a section through the slide and measuring-piece.

What we claim as our invention, and wish to secure by Letters Patent, is—

Connecting with the machine a harrow constructed with spring-teeth so arranged by means of a slide-hinge, $g\ g$, that the wheel-track toward the land to be sowed can always be left undisturbed as an accurate guide in returning across the field.

MARCUS SAGE.
SILAS S. SAGE.

Witnesses:
JULIUS EDWARDS,
ADDISON McKEE.